Patented Aug. 3, 1926.

1,594,627

UNITED STATES PATENT OFFICE.

JULIUS R. MEYERS, OF EVANSTON, ILLINOIS.

PROCESS FOR MAKING CHEESE.

No Drawing.     Application filed November 27, 1925. Serial No. 71,796.

This invention relates to a process of making cheese and concerns itself particularly with a process of cheese making which results in the economical production of a uniform product of excellent quality.

In cheese-making processes as generally practiced heretofore the curds after being made in a desired manner are pressed into a bandaged mold to expel excess moisture and to form the same into cheeses of desired shape and size. After curing these cheeses are paraffined, boxed and shipped. Such methods are objectionable in that the curing is not accurately controlled in many cheese factories and in that a non-uniform product often results. Therefore, cheese made by such methods must often be remade to produce an edible product having desired commercial characteristics. Such remaking, of course, adds to the expense and involves waste of the rind, bandage, paraffin and box used when the cheese was originally made.

It is an important object, therefore, of this invention to provide a process of making cheese which overcomes many of such disadvantages.

According to my improved process the curds are first made from sweet milk in the usual manner.

After making, the curds are permitted to drain without the application of external pressure and are then hand-stirred, matted, milled, salted or otherwise treated in accordance with the final product desired, but not pressed. The curds are then transferred to suitable containers wherein they may be transported to a curing room or plant to undergo the desired curing process. This process may, if desired, be hastened by the addition to the curds of desired chemicals, such as sodium citrate, potassium tartrate, or the like, in small percentages, the action of which serves to break down the curds. The curing of the curds may also be controlled by the temperature of the curing room, lower temperatures retarding and higher temperatures facilitating bacterial action and curing. The limits of such temperatures and times required for proper curing under given conditions will be well-known to those skilled in the particular art to which this invention pertains.

After the curds are properly cured they are removed to a suitable receptacle wherein they are heated and agitated until thoroughly fused and so sterilized as to insure reasonably good keeping qualities. During this heating and fusing of the curds into cheese the same is brought to a desired moisture content either by evaporation or by the addition of a suitable fluid preferably milk or cream thereto. While the cheese, which is formed by so heating the cured curds, is still in a fused condition it is poured into suitable containers of a desired shape where it takes the desired form upon cooling without the application of external pressure and is ready for commercial use.

It will be evident that the process of this invention is particularly valuable for utilization by small cheese factories where it is impracticable to maintain a proper curing room under competent supervision. In such cases the curds made by such factories may be transported to a common curing plant where they may be properly and uniformly cured under expert supervision and there made into cheese of uniform quality by the improved process of this invention. In this way the rind or scraping loss and the cost of pressing, bandaging and paraffining is eliminated and more important still, a uniform product of desired quality having excellent keeping qualities is assured.

I am aware that various details of carrying out the various steps of the process of this invention may be varied through a considerable range and I therefore do not purpose limiting the patent granted on this application, otherwise than limited by the prior art.

I claim as my invention:

1. The process of making cheese, comprising making sweet milk curds, permitting excess liquid to drain therefrom without the application of external pressure, transferring said curds to a curing room and curing the same, fusing the curds after curing and transferring the cheese formed by fusing such curds into containers of desired form wherein the cheese is permitted to cool.

2. The process of making cheese, comprising making sweet milk curds, permitting excess liquid to drain therefrom without the application of external pressure, transferring said curds to a curing room and curing the same, fusing the curds after curing and forming and cooling the cheese formed by fusing such cured curds without the application of external pressure.

3. The process of making cheese, comprising making sweet milk curds, permitting excess liquid to drain therefrom without the application of external pressure, transferring said curds to a curing room and curing the same, and fusing the cured curds to provide a cheese of a desired moisture content.

4. The process of making cheese, comprising making sweet milk curds, removing excess liquid therefrom without the application of external pressure, transferring the curds to a curing room and curing the same and heating the cured curds to kill or retard undersirable bacteria and to form fused cheese therefrom.

5. The process of making cheese, comprising making curds, removing excess liquid therefrom without the application of external pressure, transferring the curds to a curing room and curing the same, heating and agitating the cured curds to form a fused cheese therefrom and transferring the fused cheese to containers of desired form to solidify the same by cooling.

6. The process of making cheese from cured sweet milk curds comprising heating the curds to fuse the same to a cheese of a desired moisture content and state of sterilization and allowing the same to solidify in containers of desired form and size.

In testimony whereof I have hereunto subscribed my name.

JULIUS R. MEYERS.